(12) United States Patent
Elg et al.

(10) Patent No.: US 9,554,107 B2
(45) Date of Patent: Jan. 24, 2017

(54) METHOD AND APPARATUS FOR REDUCING COLOR FRINGING IN COMPOSITE IMAGES

(71) Applicant: Sony Corporation, Tokyo (JP)

(72) Inventors: Johannes Elg, Helsingborg (SE); Daniel Linåker, Lund (SE); Jonas Gustavsson, Iomma (SE); Mats Wernersson, Helsingborg (SE); Allan Johansson, Lund (SE)

(73) Assignee: Sony Corporation, Tokyo (JP)

( * ) Notice: Subject to any disclaimer, the term of this patent is extended or adjusted under 35 U.S.C. 154(b) by 10 days.

(21) Appl. No.: 14/378,579

(22) PCT Filed: Feb. 7, 2014

(86) PCT No.: PCT/IB2014/058863
§ 371 (c)(1),
(2) Date: Aug. 13, 2014

(87) PCT Pub. No.: WO2015/118385
PCT Pub. Date: Aug. 13, 2015

(65) Prior Publication Data
US 2016/0249028 A1    Aug. 25, 2016

(51) Int. Cl.
*H04N 9/64* (2006.01)
*G02B 27/00* (2006.01)
(Continued)

(52) U.S. Cl.
CPC ............ *H04N 9/646* (2013.01); *G02B 27/005* (2013.01); *G06T 5/003* (2013.01); *G06T 5/50* (2013.01)

(58) Field of Classification Search
CPC ............ H04N 9/646; G06T 5/003; G06T 5/50; G02B 27/005
See application file for complete search history.

(56) References Cited

U.S. PATENT DOCUMENTS 3,971,065 A    7/1976  Bayer
6,859,228 B1   2/2005  Chang et al.
(Continued)

OTHER PUBLICATIONS

International Search Report mailed Jun. 4, 2014 in re International Application No. PCT/IB2014/058863. European Patent Office, Rijswijk, NL.
(Continued)

*Primary Examiner* — James Hannett
(74) *Attorney, Agent, or Firm* — Coats & Bennett, PLLC

(57) ABSTRACT

A method and apparatus for recording a composite image from a lens array are disclosed. A first composite image is recorded using a first lens providing imaging data in a first color, a second lens providing imaging data in a second color, and a third lens providing imaging data in a third color, wherein the first, second, and third colors are different colors. A second composite image is recorded using the first lens, a fourth lens providing imaging data in the second color, and a fifth lens providing imaging data in the third color. The first and second composite images are compared to identify color fringed areas. Based on the relative size and location of the color fringed areas in the first and second composite images, a de-fringing algorithm is applied to at least one of the composite images to mitigate the color fringing in the color fringed areas.

12 Claims, 12 Drawing Sheets

(51) Int. Cl.
*G06T 5/00* (2006.01)
*G06T 5/50* (2006.01)

(56) References Cited

U.S. PATENT DOCUMENTS

| | | | |
|---|---|---|---|
| 8,385,642 B2 | 2/2013 | Chuang et al. | |
| 8,400,555 B1 | 3/2013 | Georgiev et al. | |
| 8,610,813 B2* | 12/2013 | Gao | G02B 27/0075 348/222.1 |
| 9,055,248 B2* | 6/2015 | Atif | G02B 27/0075 |
| 2003/0160864 A1 | 8/2003 | Kremen | |
| 2011/0158514 A1 | 6/2011 | Chuang et al. | |
| 2012/0229682 A1 | 9/2012 | Ng et al. | |
| 2012/0281072 A1 | 11/2012 | Georgiev et al. | |
| 2015/0030247 A1* | 1/2015 | Shu | H04N 1/58 382/167 |

OTHER PUBLICATIONS

Lucas, B., et al., "An Iterative Image Registration Technique with an Application to Stereo Vision." Proceedings DARPA Image Understanding Workshop, Apr. 1981, pp. 121-130. Accessed at http://flohauptic.googlecode.com/svn-history/r18/trunk/optic_flow/docs/articles/LK/Barker_unifying/lucas_bruce_d_1981_2.pdf.

Ju, Haie Jin et al., "Color fringe removal in narrow color regions of digital images." Signal, Image and Video Processing. Nov. 30, 2012. Springer-Verlag, London, UK.

Servin, M., et al., "Automatic fringe detection algorithm used for moire deflectometry." Applied Optics 29(22). Aug. 1, 1990. p. 3266-3270. OSA, Washington, DC.

Kim, Baek-Kyu et al., "Automatic detection and correction of purple fringing using the gradient information and desaturation." EUSIPCO 2008, Lausanne, Switzerland, Aug. 25-29, 2008. EURASIP.

* cited by examiner

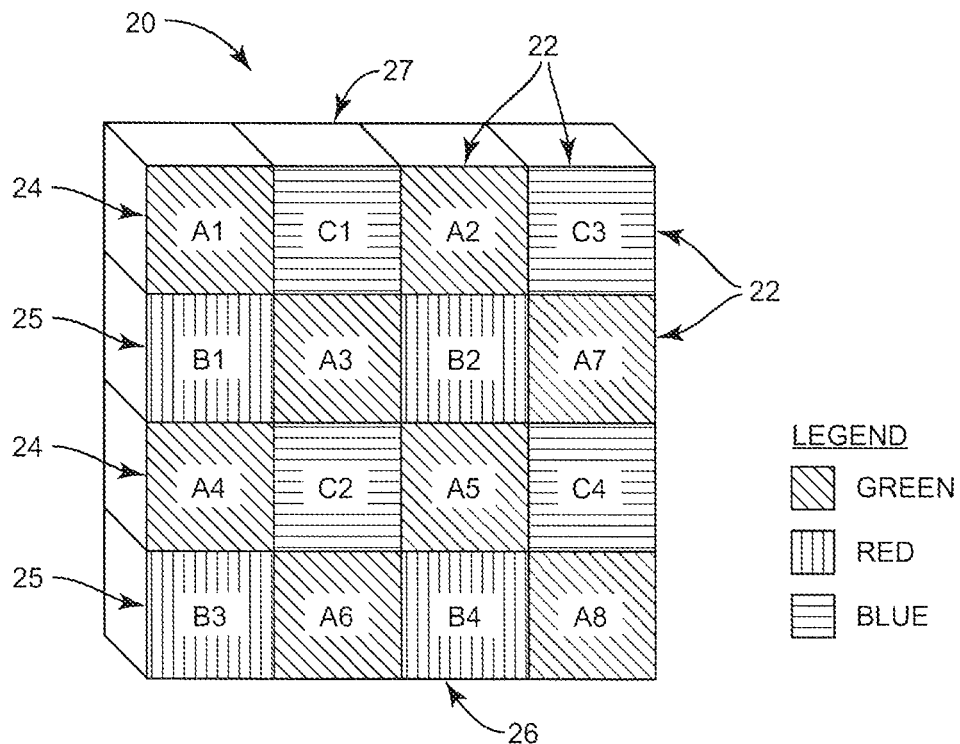
FIG. 2
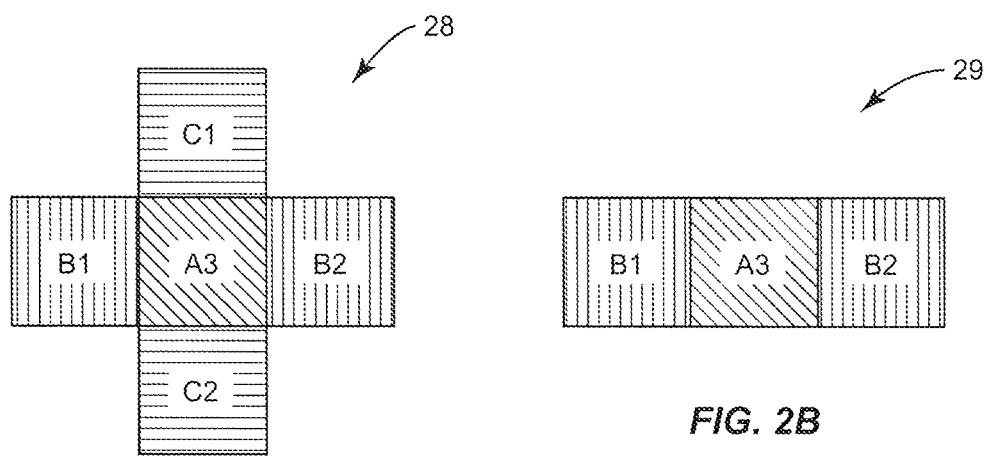
FIG. 2A
FIG. 2B

METHOD AND APPARATUS FOR REDUCING COLOR FRINGING IN COMPOSITE IMAGES

TECHNICAL FIELD

The present disclosure relates to reducing color fringing, and more particularly to reducing color fringing in composite images recorded using a lens array.

BACKGROUND

Some cameras, such as so-called "light field" or "plenoptic" cameras, utilize an array of lenses to capture light information for a scene. In some such cameras, different monochromatic lenses are used, each of which records light in shades of a given color. For example, adjacent lenses may be used, each of which records imaging data in one shades of red, green, or blue (RGB). Imaging data from the RGB lenses can then be combined to form a composite image. Because the RGB lenses are adjacent to each other, they provide imaging data from slightly different vantage points, which can cause color fringing in recorded composite images.

In the past, a disparity estimation and correlation technique was used to address such color fringing. According to this technique, recorded images were scanned one pixel at a time to find maximum correlation positions of colors, and a depth map had to be calculated. This technique was computationally intensive and inefficient.

SUMMARY

According to one aspect of the present disclosure, a method of recording a composite image using a lens array comprising a plurality of monochromatic lenses is disclosed, in which each of the lenses provides imaging data in shades of a single color. A first composite image is recorded using a first lens that provides imaging data in a first color, a second lens that provides imaging data in a second color, and a third lens that provides imaging data in a third color, wherein the first, second, and third colors are different colors. A second composite image is recorded using the first lens, a fourth lens that provides imaging data in the second color, and a fifth lens that provides imaging data in the third color. The second and fourth lenses are situated on opposite sides of the first lens, and the third and fifth lenses are also situated on opposite sides of the first lens. Color fringed areas in the first and second composite images are identified. Based on the relative size and location of the color fringed areas in the first and second composite images, a de-fringing algorithm is applied to at least one of the composite images to mitigate the color fringing in the color fringed areas.

In one or more embodiments, applying a de-fringing algorithm includes overlay at least the color fringed portions of the first and second composite images. For areas that are color fringed in the first composite image but are not color fringed in the second composite image, the imaging data for those areas of the first composite image is replaced with the imaging data from those areas of the second composite image to form a modified first composite image. For areas that are color fringed in the second composite image but are not color fringed in the first composite image, the imaging data for those areas of in the second composite image is replaced with the imaging data from those areas of the first composite image to form a modified second composite image. This may be repeated as needed to further modify the first and second composite image based on varying alignments of the imaging data from the lenses.

According to another aspect of the present disclosure, a camera is disclosed which comprises a lens array and a processor circuit. The lens array includes a plurality of monochromatic lenses, each of which is configured to record imaging data in shades of a single color. The processor circuit is configured to record a first composite image using a first lens that provides imaging data in a first color, a second lens that provides imaging data in a second color, and a third lens that records imaging data in a third color, wherein the first, second, and third colors are different colors. The processor circuit is further configured to record a second composite image using the first lens, a fourth lens that provides imaging data in the second color, and a fifth lens that provides imaging data in the third color. The second and fourth lenses are situated on opposite sides of the first lens, and the third and fifth lenses are situated on opposite sides of the first lens. The processor circuit is further configured to identify color fringed areas in the first and second composite images; and based on the relative size and location of the color fringed areas in the first and second composite images, apply a de-fringing algorithm to at least one of the composite images to mitigate the color fringing in the color fringed areas.

In one or more embodiments, to apply a de-fringing algorithm, the processor circuit is configured to overlay at least the color fringed portions of the first and second composite images. For areas that are color fringed in the first composite image but are not color fringed in the second composite image, the imaging data for those areas of the first composite image is replaced with the imaging data from those areas of the second composite image to form a modified first composite image. For areas that are color fringed in the second composite image but are not color fringed in the first composite image, the imaging data for those areas of in the second composite image is replaced with the imaging data from those areas of the first composite image to form a modified second composite image. This may be repeated as needed to further modify the first and second composite image based on varying alignments of the imaging data from the lenses.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 illustrates an example lens array which includes a plurality of monochromatic lenses.

FIG. 2A illustrates a subset of lenses from the lens array of FIG. 2.

FIG. 2B illustrates another subset of lenses from the lens array of FIG. 2.

DETAILED DESCRIPTION

Figure 1:
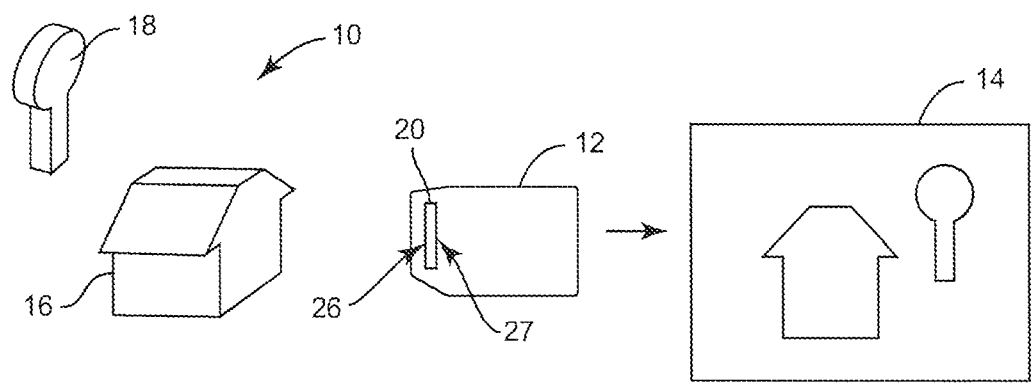
FIG. 1 illustrates an example scene, a camera oriented to record an image of that scene, and an expected image of the scene.

The present disclosure describes a method and apparatus for recording an image using a lens array (e.g., an N×N camera array), in which various monochromatic lenses within the array each provide imaging data in shades of a single color. Multiple composite images are recorded, each with three lenses that provide imaging data in three different colors. Color fringed areas are identified in the multiple composite images, and a de-fringing algorithm is applied to at least one of the composite images to mitigate the color fringing and produce a corrected composite image. For convenience, similar reference numerals are used throughout the Figures to indicate similar elements.

Figure 1A:
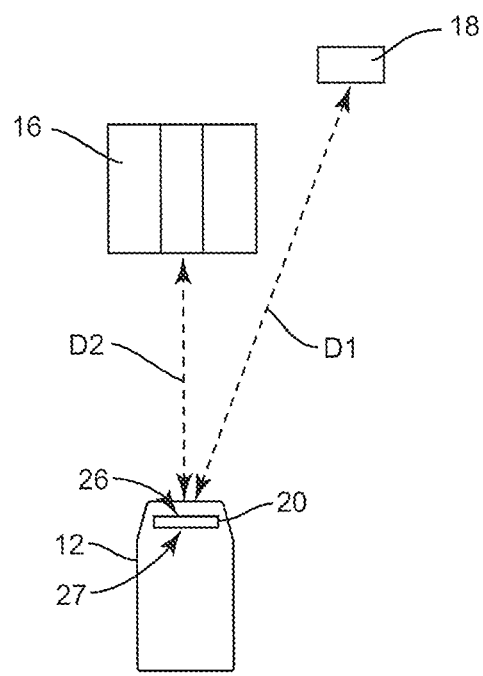
FIG. 1A illustrates an aerial view of the scene of FIG. 1.

FIG. 1 illustrates an example scene 10, a camera 12 oriented to record an image of that scene, and an expected image 14 of the scene 10. The scene 10 includes a house 16 and a tree 18. The camera 12 includes a lens array 20 which includes a plurality of monochromatic lenses, and is operative to record composite images using the monochromatic lenses. As shown in FIG. 1A (which illustrates an aerial view of the scene 10), the house 16 is a first distance D1 away from the camera 12, and the tree 18 is a smaller second distance D2 away from the camera 20 (where D1>D2).

FIG. 2 illustrates an example 4×4 lens array 20 which could be used in the camera 12 of FIG. 12. The lens array 20 includes a plurality of monochromatic lenses 22, each of which only provides imaging data in shades of a single color. The lens array 20 includes a plurality of lenses A1-A8 of a first type which provide imaging data in a first color, a plurality of lenses B1-B4 of a second type which provide imaging data in a second color, and a plurality of lenses C1-C4 of a third type which provide imaging data in a third color. For the discussion below, it will be assumed that the first color is green, the second color is red, and the third color is blue, such that the lenses 22 in the array 20 emulate a Bayer Filter. Of course, it is understood that this is only an example, and that other colors and arrangements and/or other lens array sizes, could be used.

As shown in FIG. 2, the lens array 20 includes a first type of row 24 (i.e., the first and third rows) in which the A and C lenses are interleaved, and also includes a second type of row 25 (i.e., the second and fourth row) in which the A and B lenses are interleaved. The first and second types of rows 24, 25 are themselves interleaved in the array 22. Also, the A lenses in the rows 24 are offset from the A lenses in the rows 25. The lens array 20 includes a front side 26 and a back side 27. If one combined monochromatic imaging data from multiple ones of the lenses to form a polychromatic composite image, color fringing will occur because the lenses record images of a given scene from slightly different vantage points. Also, because of the varying distances D1 and D2 between the camera 12 and the house 16 and tree 18, it is likely that differing amounts of color fringing will occur for the house 16 and tree 18 in composite images recorded by the camera 12.

Figure 3:
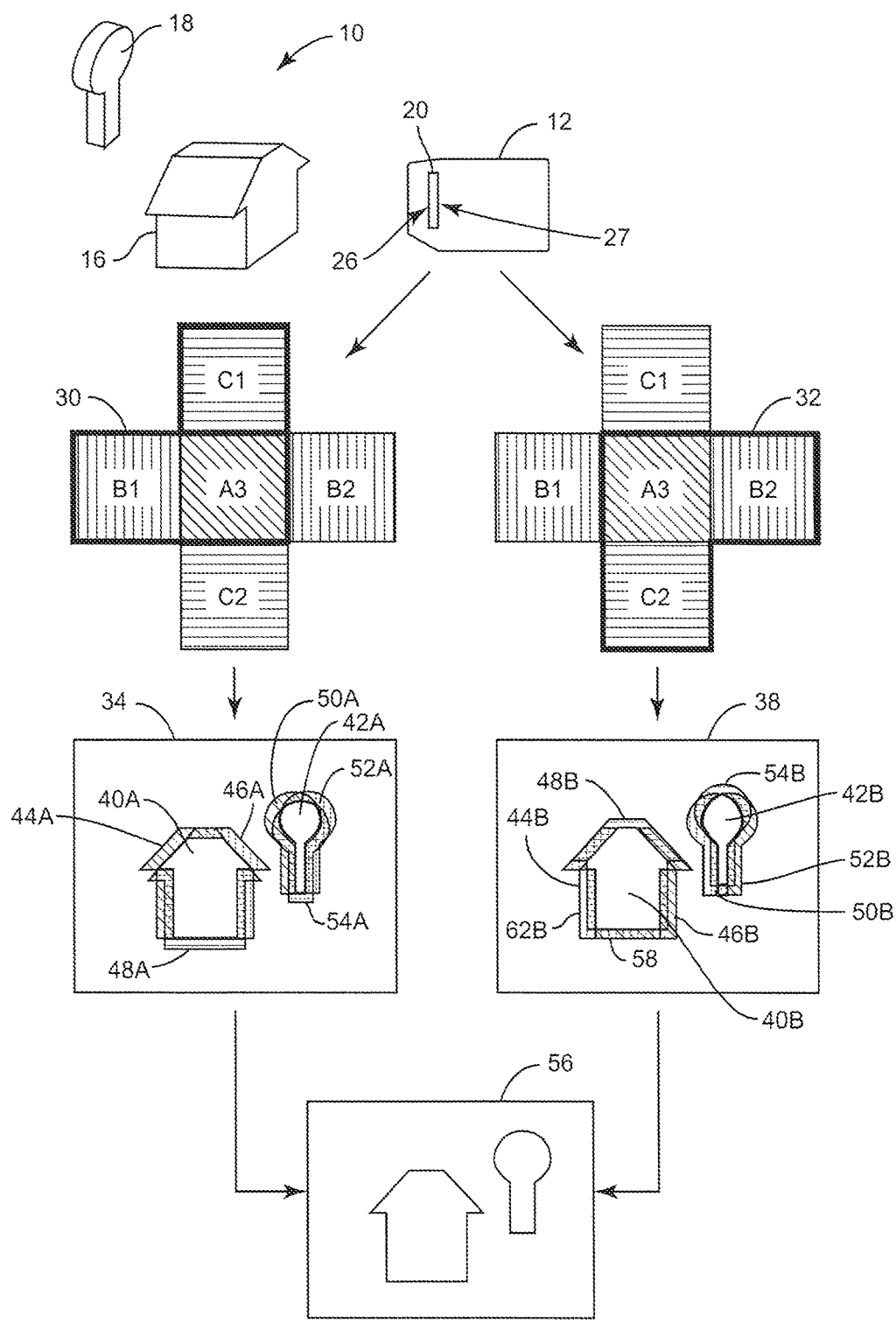
FIG. 3 illustrates example composite images which are recorded by the subset of lenses of FIG. 2A and include color fringing.

FIG. 3 illustrates how composite images recorded using imaging data from a subset 28 of lenses from the lens array 20 (see FIG. 2A) exhibit color fringing. A first composite image 34 is formed from imaging data from lens group 30 that includes lens A3, B1, and C1. As shown in FIG. 3, the composite image 34 includes non-color fringed areas 40A, 42A, but also includes color fringed areas 44A, 46A, 48A, 50A, 52A, and 54A. A second composite image 38 is formed from imaging data from lens group 32 that includes lens A3, B2, and C2. As shown in FIG. 3, the composite image 38 includes non-color fringed areas 40B, 42B, but also includes color fringed areas 44B, 46B, 48B, and 50B, 52B, and 54B. However, by applying a de-fringing algorithm to the fringed areas 44-54, a corrected composite image 56 can be obtained.

Figure 4:
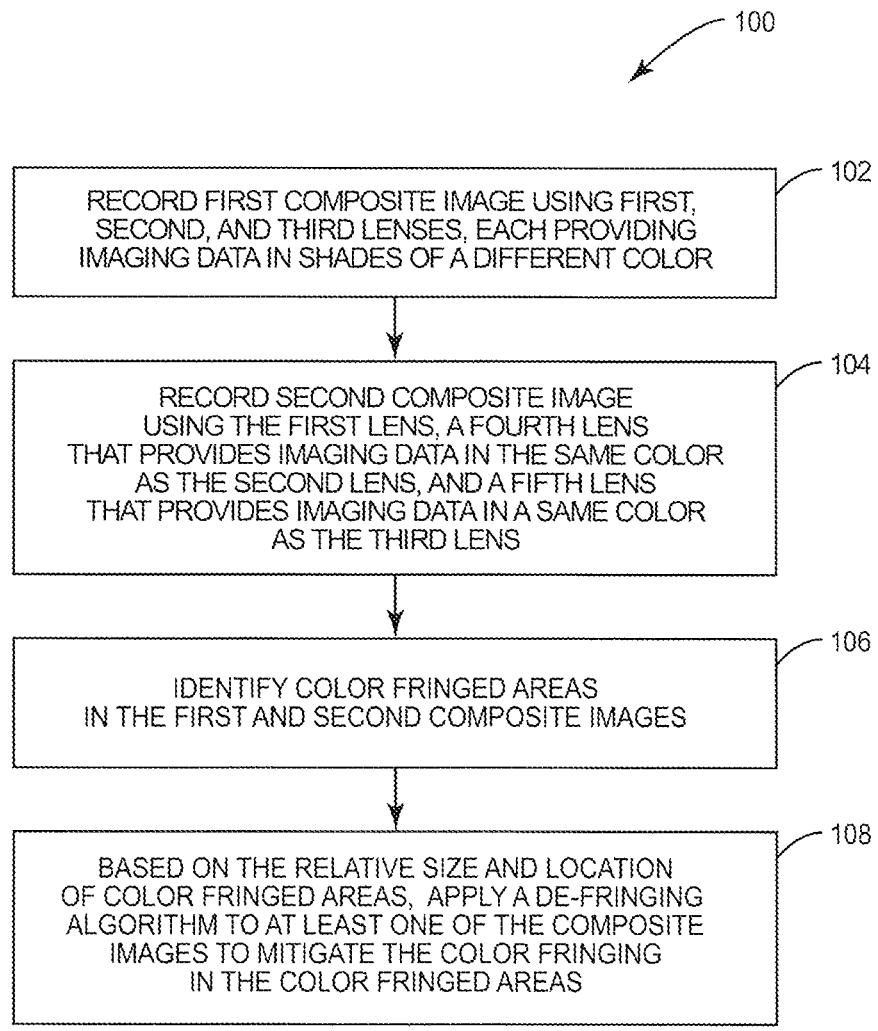
FIG. 4 illustrates a method of recording a composite image from a camera array which mitigates color fringing.

FIG. 4 illustrates a method 100 of recording a composite image from a lens array (e.g., lens array 20) which mitigates color fringing. As discussed above, the lens array 20 includes a plurality of monochromatic lenses, each of which provides imaging data in shades of a single color. A first composite image (e.g., image 34) is recorded (block 102) using a first lens that provides imaging data in a first color (e.g., lens A3), a second lens that provides imaging data in a second color (e.g., lens B1), and a third lens that provides imaging data in a third color (e.g., lens C1). The first, second, and third colors are different colors. A second composite image (e.g., image 38) is recorded (block 104) using the first lens, a fourth lens that provides imaging data in the second color (e.g., lens B2), and a fifth lens that provides imaging data in the third color (e.g., lens C2). The second and fourth lenses are situated on opposite sides of the first lens, and the third and fifth lenses are also situated on opposite sides of the first lens. Color fringed areas in the first and second composite images are identified (block 106). Based on the relative size and location of the color fringed areas in the first and second composite images, a de-fringing algorithm is applied to at least one of the composite images to mitigate color fringing in the identified color fringed areas (block 108).

In one or more embodiments, identifying color fringed areas (block 106) is performed by analyzing red, green, and blue (RGB) channels and looking for large offsets between the different channels. In one or more embodiments identifying color fringed areas include looking for abnormal changes in gradient values of RGB channels (e.g., as described in U.S. Pat. No. 8,385,642). Some additional example techniques are described in "Method for Removing Color Fringe in Digital Image" (US Published Application No. 2011/0158514). Various edge detection techniques may also be used. Because various techniques for identifying color fringing are known to those of ordinary skill in the art, they are not discussed in detail in this application. Once the color fringed areas are identified, based on the relative size and location of the color fringed areas in the composite images, a de-fringing algorithm is applied to at least one of the composite images to mitigate the color fringing in the color fringed areas.

Figure 5A:
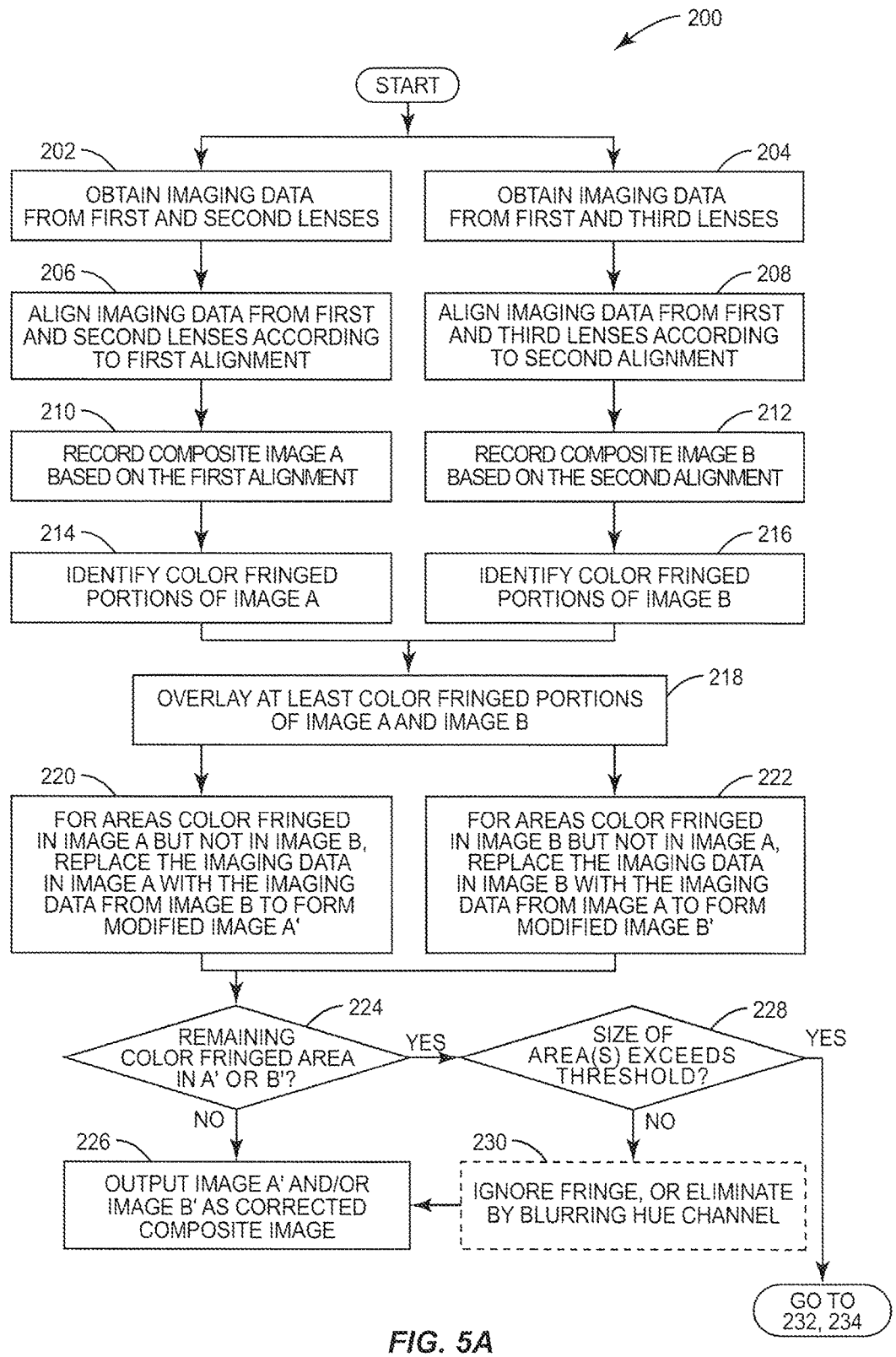
FIGS. 5A-5B illustrate an example implementation of the method of FIG. 4.
Figure 5B:
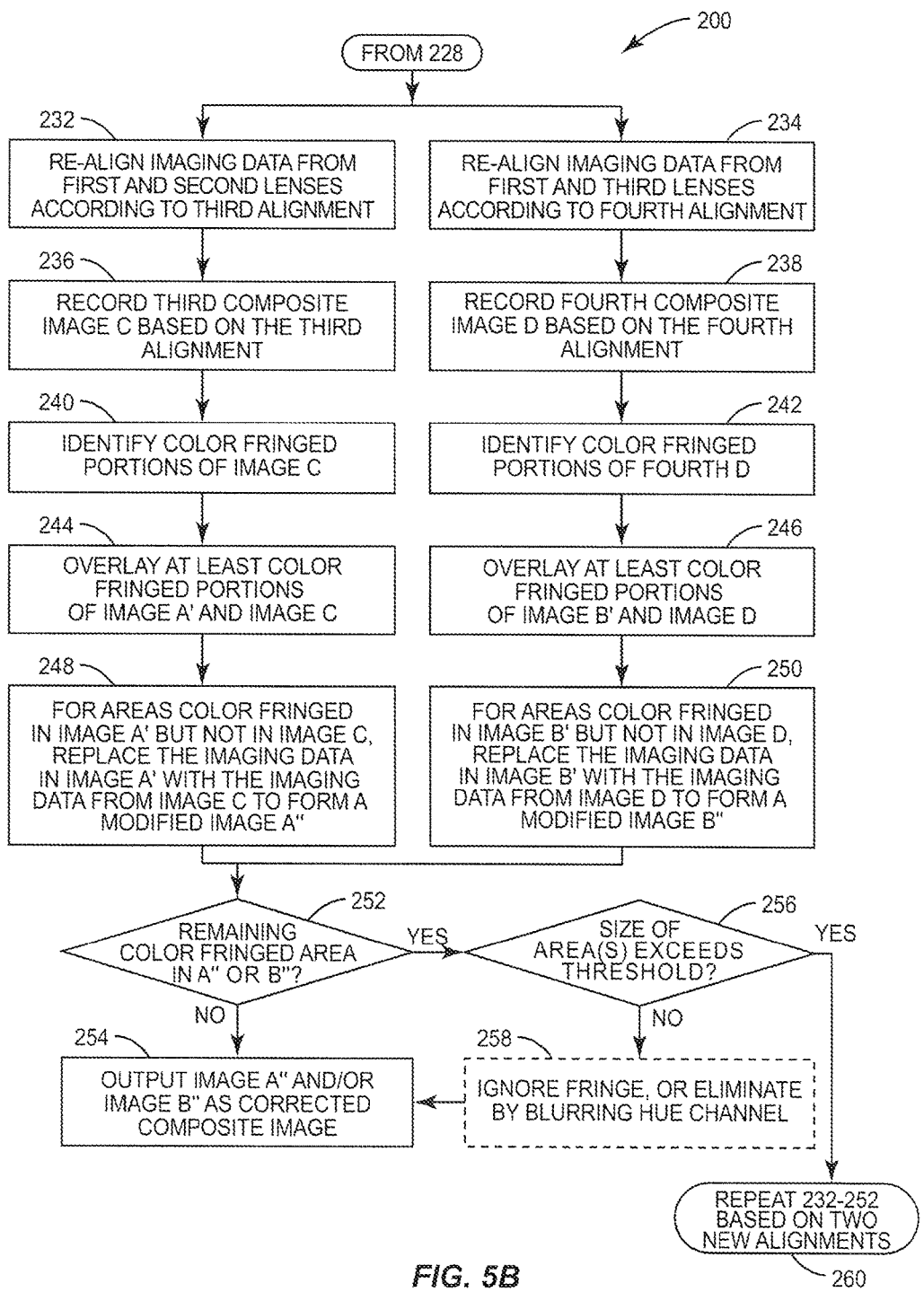
Figure 6:
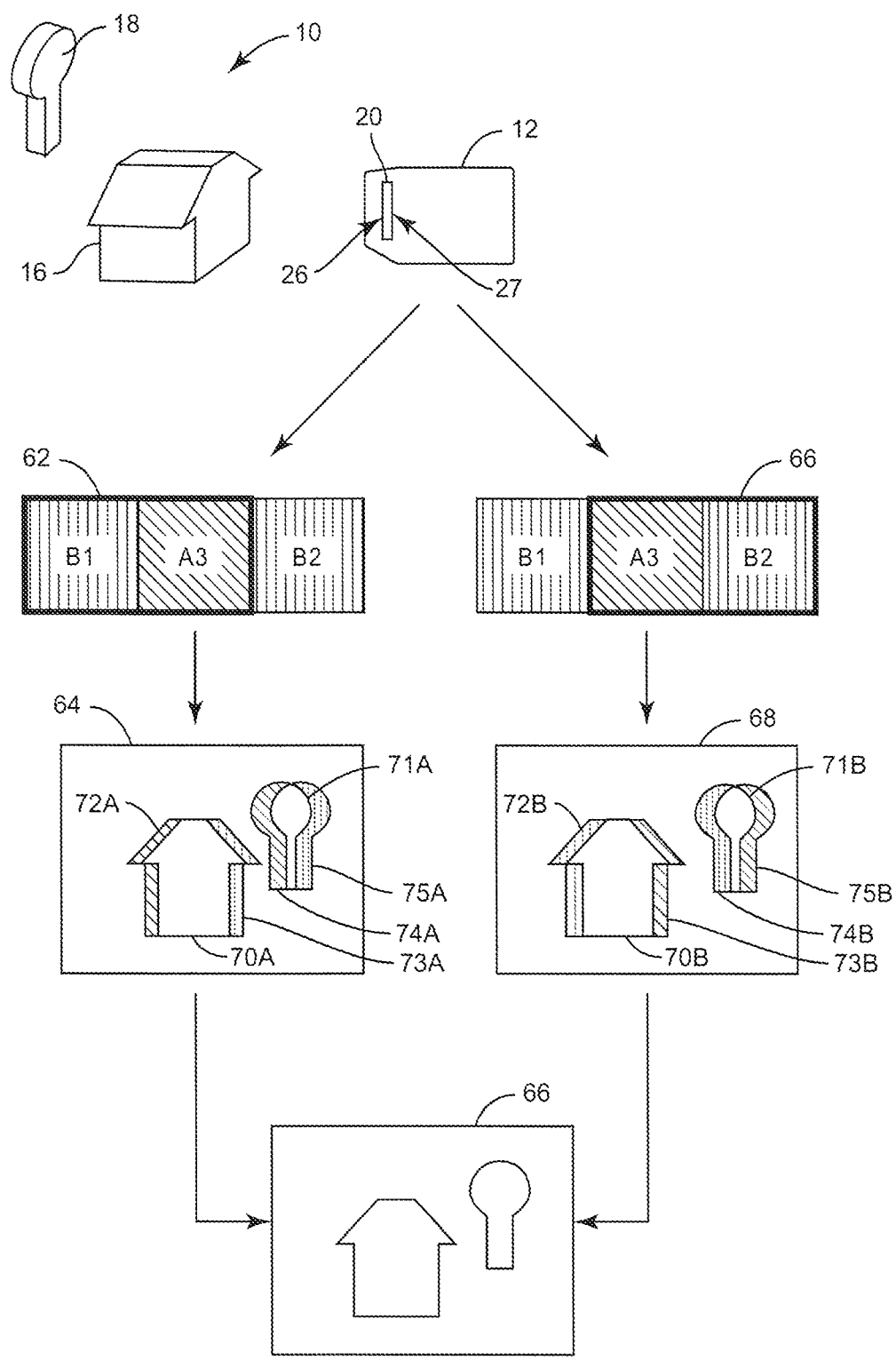
FIG. 6 illustrates example composite images which are recorded by the subset of lenses of FIG. 2B and include color fringing.

FIGS. 5A-5B illustrate an example implementation 200 the method 100 of FIG. 4. For ease of explanation, FIGS. 5A-5B are discussed in connection with a simplified example that uses imaging data from subset 29 of lenses from the lens array 20 (see FIGS. 2B and 6), which includes lenses A3, B1, and B2. For the discussion below, we will assume that the "first composite image" of block 102 corresponds to image 64' of FIG. 6 (also shown in FIG. 7A), that the "second composite image" of block 104 correspond to image 68' of FIG. 6 (also shown in FIG. 7B), and that recording of the composite images 64, 68 (of FIGS. 7A, 7B) has occurred prior to the blocks of FIGS. 5A-5B.

Figure 7A:
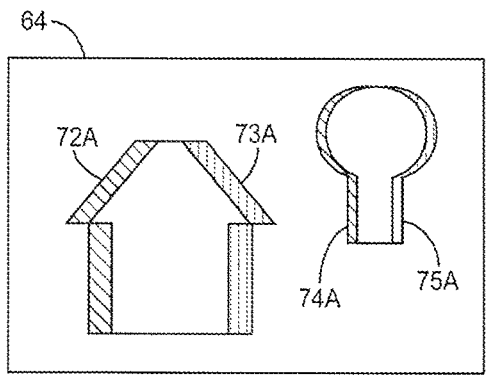
FIGS. 7A and 7B illustrate the composite images of FIG. 6.

Referring to FIG. 7A, composite image 64 includes imaging data from lens group 62 of the subset 29 that includes lenses B1 and A3, and composite image 68 includes imaging data from lens group 66 of the subset 29 that includes lenses A3 and B2. Each image 64, 68 includes multiple non-color fringed areas 70, 71. However, because the lenses B1, A3, and B2 are offset from each other (even if only by a small amount), the respective composite images 64, 68 include color fringed areas 72, 73, 74, and 75.

Referring now to FIG. 5A, imaging data is obtained from a first lens and a second lens (e.g., lens A3 and B1) (block 202), and is also obtained from the first lens and a third lens (e.g., lens A3 and B2) (block 204). For the discussion below, assume that the obtained imaging data is the imaging data of composite images 64, 68 (i.e., from lenses A3, B1, B2). Images 64, 68 are also shown in FIGS. 7A, 7B.

Figure 8A:
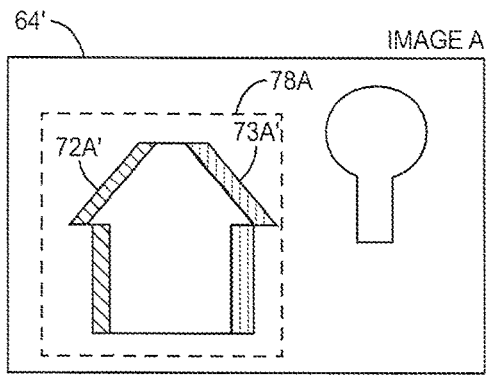
FIGS. 8A and 8B illustrate modified versions of the composite images of FIGS. 7A and 7B.
Figure 8B:
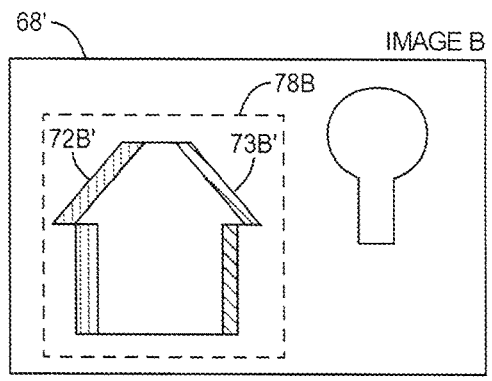

The imaging data from the first and second lenses is aligned according to a first alignment (see block 206 and FIG. 8A), and the imaging data from the first and third lenses is aligned according to a second alignment (see block 208 and FIG. 8B). Based on the first alignment, a composite image A is recorded (see block 210 and image 64' of FIG. 8A). Based on the second alignment, a composite image B is recorded (see block 212 and image 68' of FIG. 8B). In one or more embodiments, the first and second alignments minimize color fringing for objects at a given distance away from the lens array 20 (e.g., distance D1). In one or more embodiments, the aligning of blocks 206, 208 is based on a width of color fringing at the given distance prior to alignment (e.g., if color fringing is 5 pixels wide, move data from corresponding lens 5 pixels).

Figure 7B:
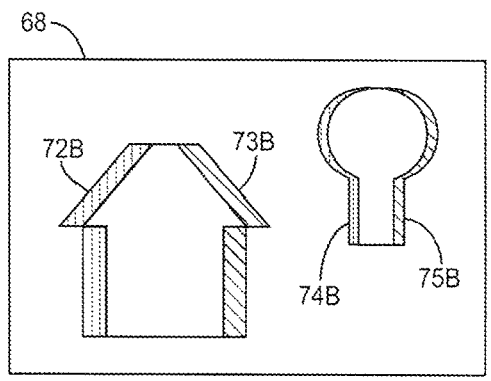

As shown in FIGS. 7A, 7B, the composite images 64, 68, each include color fringed areas 72, 73 (in which the house 16 is color fringed) and color fringed areas 74, 75 (in which the tree 18 is color fringed). However, if the imaging data from lenses B1, A3 is aligned for objects at the distance D1 away from the camera 12, then the color fringed areas 74A, 75A can be significantly reduced and possibly even eliminated (see composite image 64' in FIG. 8A), and the color fringed areas 42A, 43A can also be reduced (see color fringed areas 72A', 73A' in FIG. 8A). Similarly, if the imaging data from group 76 is aligned for objects at distance D1 away from the camera 12, then the color fringed areas 74B, 75B can be significantly reduced and possibly even eliminated (see composite image 68' FIG. 8B), and the color fringed areas 72B, 73B can also be reduced (see color fringed areas 72B', 73B' in FIG. 5B).

The color fringing of areas 72' and 73' can be further reduced by replacing portions of image 64' with portions of image 68', and vice versa. This replacement is based on identifying color fringed portions of image 64' and 68' (blocks 214, 216), and overlaying at least the color fringed areas of the images 64', 68' (block 218). Based on the overlaying, a determination is made of which areas are color fringed in both images 64', 68', and which areas are color fringed in only one of the images 64', 68'.

Figure 9:
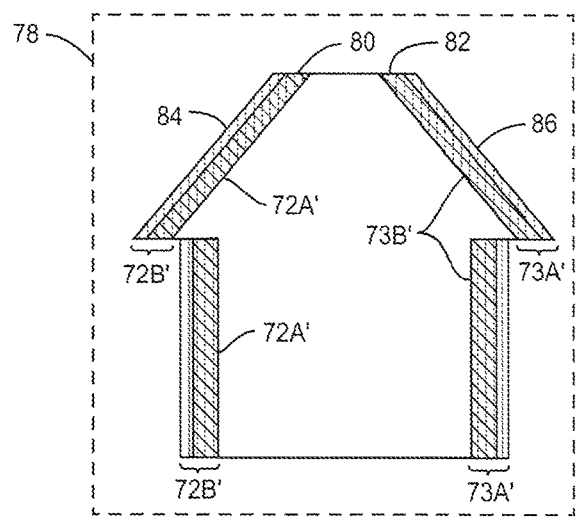
FIG. 9 illustrates an overlaying of the composite images of FIGS. 8A and 8B.

FIG. 9 illustrates the result of overlaying image portions 78A, 78B of the images 64', 68'. As shown in FIG. 9, areas 80 and 82 are color fringed in both of images 64', 68'. That is, area 80 is color fringed for both area 72A' and 72B', and area 82 is color fringed for both area 73A' and 73B'. However, a portion 84 of area 72A' is color fringed only in image 68', and a portion 86 of area 73B' is color fringed only in image 64'.

Figure 10A:
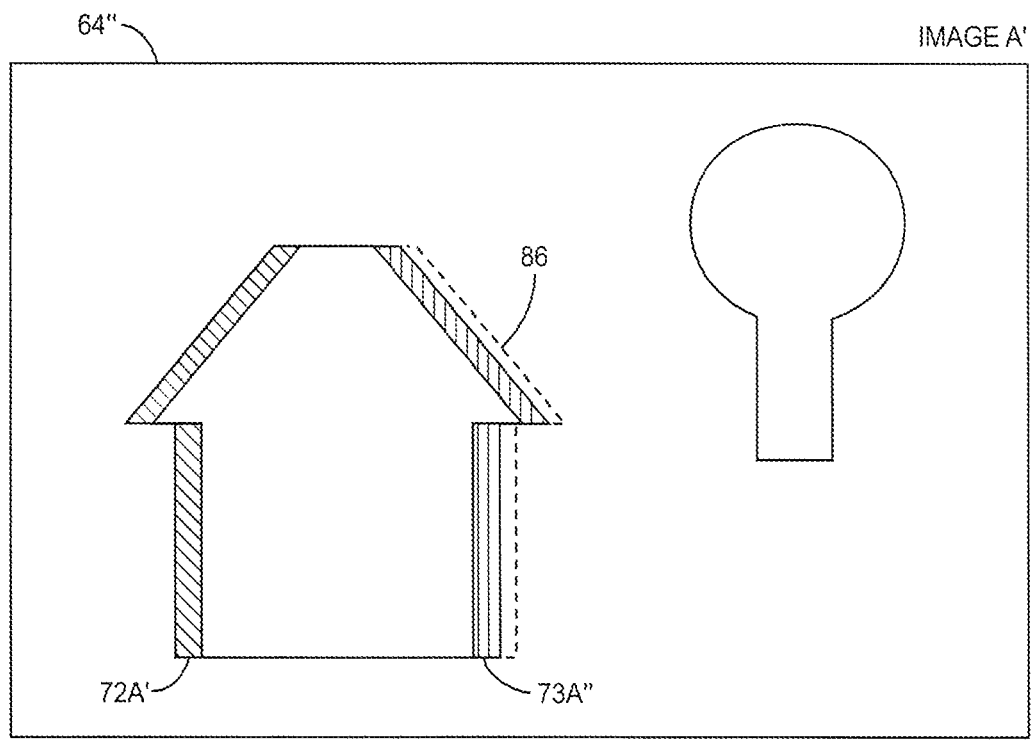
FIGS. 10A and 10B illustrate modified versions of the composite images of FIGS. 8A and 8B.

Referring again to FIG. 5A, for areas color fringed in image A but not in image B (i.e., area 86), composite image 64' is modified to reduce the size of area 73A' by replacing portion 86 of area 73A' with imaging data from the same corresponding location in image 68' to produce a modified composite image 64" having a smaller color fringed area 73A" (see FIG. 10A and block 220). Similarly, image 68' is modified to reduce the size of area 72B' by replacing portion 84 of area 42B' with imaging data from the same corresponding location in image 64' to produce a modified composite 68' having a smaller color fringed area 72B'" (see FIG. 10B and block 222). As shown in FIG. 10A, area 84 is no longer color fringed. Likewise, in FIG. 10B area 84 is no longer color fringed.

Figure 10B:
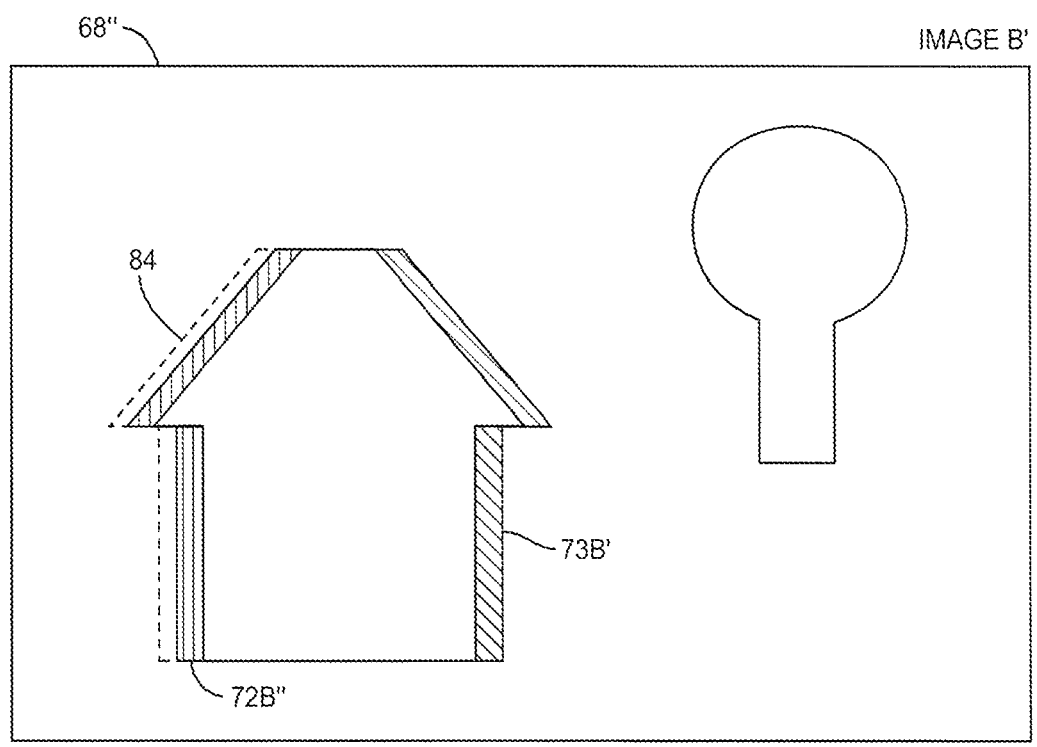

A check is then performed to determine if there are remaining color fringed areas in image A' or B' (see FIGS. 10A, 10B and block 224). If no color fringed areas remain, then one or both of images A' and B' are output as a corrected composite image (block 226). Otherwise, if a color fringed area remains (which it does in the example of FIGS. 10A, 10B), a check is performed to determine if the size of those areas exceeds a predefined threshold block 228). In one or more embodiments the size threshold is a width threshold. If the size threshold is not exceeded, then the remaining color fringed areas are either ignored or are eliminated by, for example, blurring a hue channel of one or both of the images A', B' (block 230), and one or both of the images A' and B' are output as a corrected composite image (block 226).

Figure 11A:
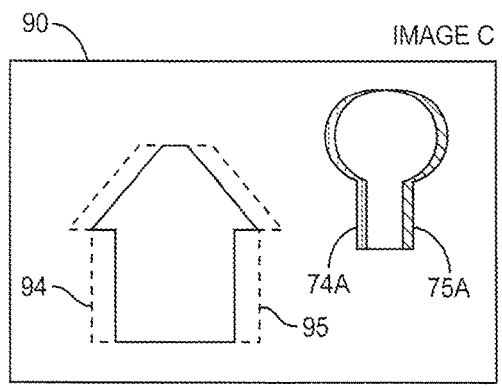
FIGS. 11A and 11B illustrate re-aligned versions of the composite images of FIGS. 7A and 7B.
Figure 11B:
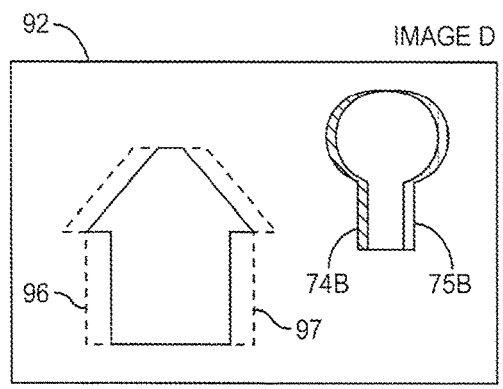

Otherwise, if the size of the color fringed areas exceeds the threshold, the imaging data from the lenses is be re-aligned according to a third alignment (block 232) and a fourth alignment (block 234). In one or more embodiments, the third and fourth alignments minimize color fringing for objects at a different distance away from the lens array 20 (e.g., distance D2). A composite image C is recorded based on the third alignment, as shown in FIG. 11A (block 236), and a composite image D is recorded based on the third alignment, as shown in FIG. 11B (block 238). In the example of FIGS. 11A, 11B, the imaging data from lens group 62 is re-aligned for objects at a second distance from the camera (e.g., distance D2 between the camera 12 and house 16) which eliminates color fringed areas 72A, 73A (see composite image 90 in FIG. 11A) but produces color fringed areas 74A, 75A. Similarly, if the imaging data from lens group 66 is re-aligned for objects at distance D2, then the color fringed areas 72B, 73B can be eliminated (see composite image 92 FIG. 11B) while producing color fringed areas 74B, 75B.

Figure 12A:
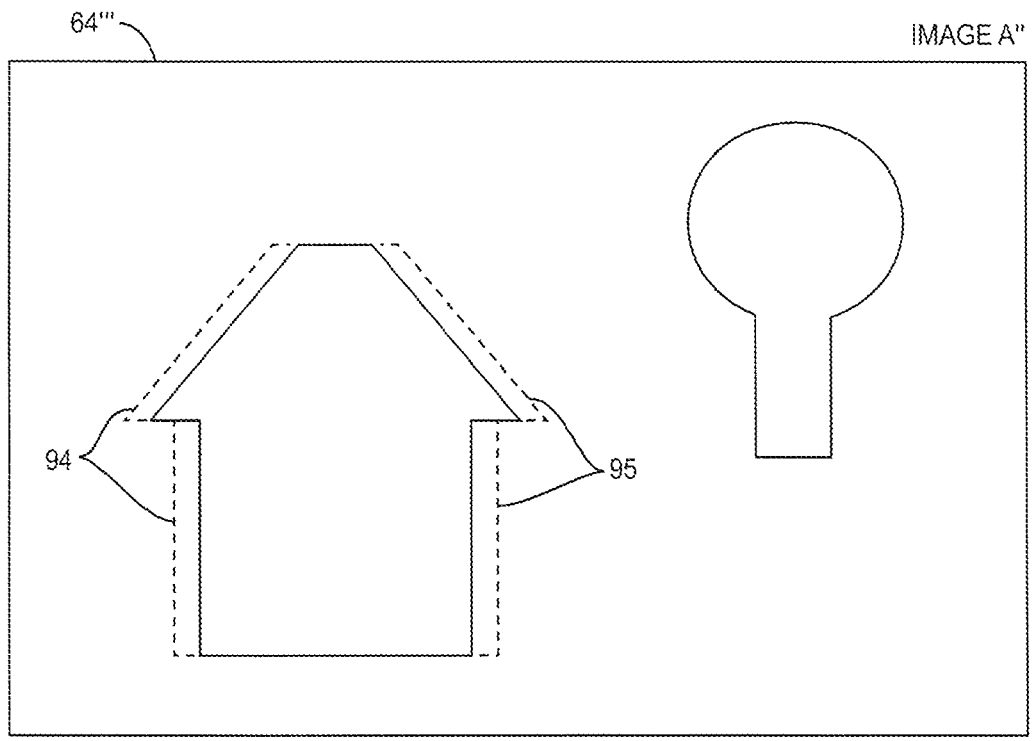
FIGS. 12A and 12B illustrate modified versions of the composite images of FIGS. 10A and 10B.

The color fringed portions of image C and D are identified (blocks 240, 242). In the example shown in FIGS. 11A, 11B, the only color fringed areas are areas 74, 75 which are adjacent to the tree. Color fringed areas of images A' and C are then overlayed (block 244). Because there is no color fringing next to the house in image C, this overlaying would result in a determination that areas 72A', 73A" are color fringed in image A' but not in image C (see corresponding areas 94, 95). Therefore, the imaging data in areas 72A', 73A" would be replaced with imaging data from areas 94, 95 of image C, to produce a modified image A" (block 248). As shown in FIG. 12A, image A" (also identified with numeral 64'") is a modified version of image A' in which areas 94, 95 of image C have been used to replace previously color fringed areas 72A' and 73A", respectively.

Figure 12B:
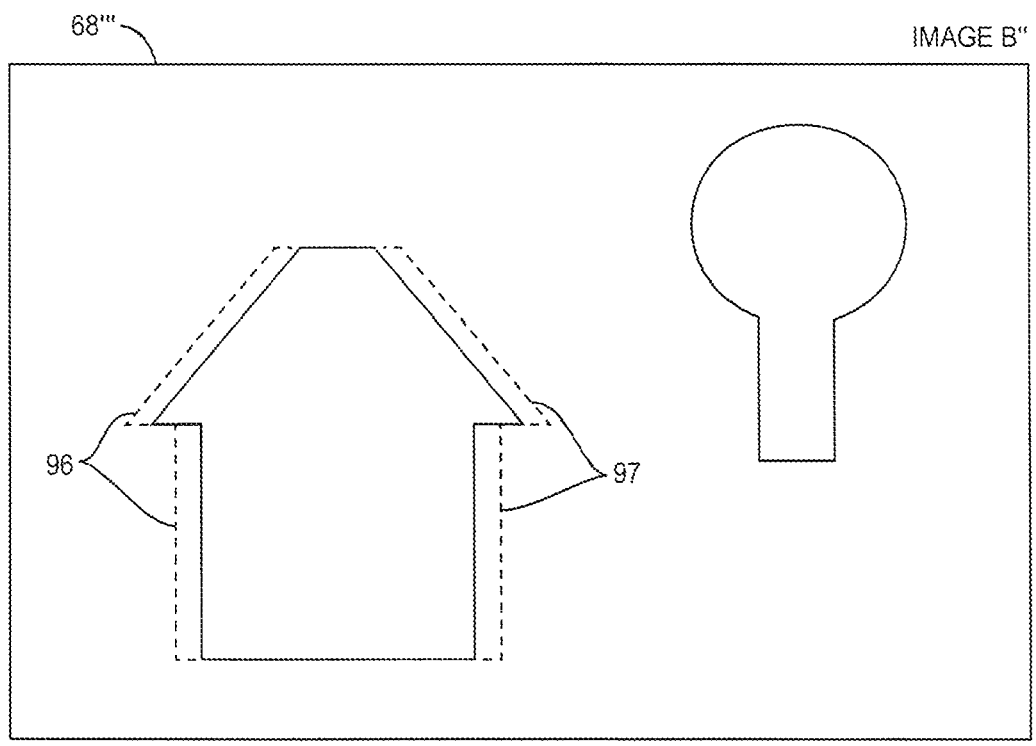

Similarly, color fringed areas of image B' and D are also overlayed (block 246). Because there is no color fringing next to the house in image D, this overlaying would result in a determination that areas 72B", 73B' are color fringed in image B' but not in image D (see corresponding areas 96, 97). Therefore, the imaging data in areas 72B", 73B' would be replaced with imaging data areas 96, 97 of image D, to produce a modified image B" (block 250). As shown in FIG. 12B, image B" (also identified with numeral 68''') is a modified version of image B' in which areas 96, 97 of image C have been used to replace previously color fringed areas 72B" and 73B', respectively.

A check is then performed to determine if any remaining color fringed areas remain in images A" or B" (block 252). If no color fringed areas remain, image A" and/or image B" are output as corrected composite images (block 254). Otherwise, if color fringing remains, a check is performed to determine if the size of those color fringed areas exceeds the size of the predefined threshold (block 256). If the size does not exceed the threshold, then the remaining color fringed areas are ignored, or are eliminated by, for example, blurring a hue channel of one or both of the images A", B" (block 258). However, if the size of remaining color fringed areas exceeds the threshold, then blocks 232-250 can be repeated based on different alignments to keep reducing the color fringed areas (block 260) (e.g., based on some object a different distance D3 from the camera 12).

FIGS. 5-12 have been discussed in connection with a simplified embodiment that uses only lens groups 62, 66. However, those of ordinary skill in the art will appreciate that the same techniques can be applied to lens groups 30, 32 of FIG. 3. The primary difference would be that blocks 202, 204 would obtain imaging data from three lenses each (e.g., lens groups 50, 54), and blocks 206, 208, 232, and 234 would align imaging data from those same lenses (e.g., lens groups 30, 32).

In one or more embodiments, the composite images 34, 38 are recorded simultaneously, such that the same imaging data from lens A3 is used in both composite images 64 and 68. In one or more such embodiments, only a single corrected image 56 is output as a corrected composite image. In one or more other embodiments, the composite images 34, 38 are recorded consecutively (e.g., as part of a video recording), such that imaging data obtained from lens A3 at different times is used in composite images 64 and 68, respectively. In one or more such embodiments, both composite images are modified to reduce color fringing and are output as corrected composite images.

Figure 13:
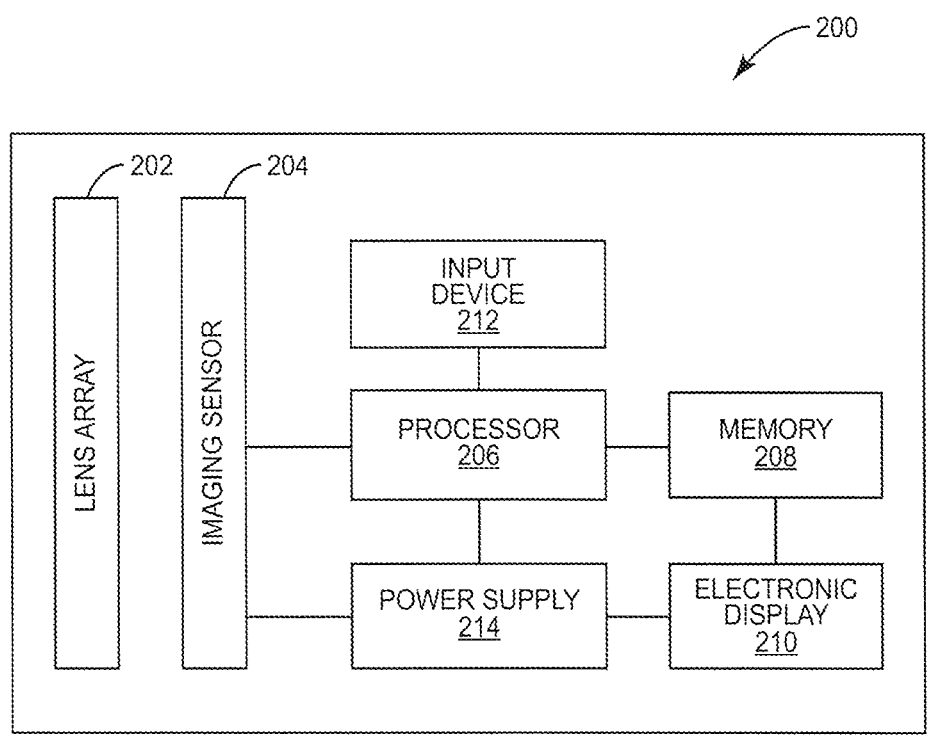
FIG. 13 illustrates the main functional elements of a camera configured to implement the method of FIG. 4.

FIG. 13 illustrates the main functional elements a camera 200 which is an example implementation of the camera 12 of FIG. 1. As shown in FIG. 13, the camera 200 includes a lens array 202 comprising a plurality of monochromatic lenses (e.g., the lens array 20), each of which is configured to provide imaging data in shades of a single color, and a processor 206. The processor 206 is configured to record a first composite image (e.g., image 64') using a first lens that provides imaging data in a first color, a second lens that provides imaging data in a second color, and a third lens that records imaging data in a third color, wherein the first, second, and third colors are different colors. The processor 206 is also configured to record a second composite image (e.g., image 68') using the first lens, a fourth lens that provides imaging data in the second color, and a fifth lens that provides imaging data in the third color. The processor 206 is configured to identify color fringed areas in the first and second composite images, and based on the relative size and location of the identified color fringed areas in the first and second composite images, is configured to apply a de-fringing algorithm to at least one of the composite images to mitigate the color fringing in the color fringed areas. The second and fourth lenses (e.g., lens B1 and B2) are situated on opposite sides of the first lens (e.g., lens A3), and the third and fifth lenses (e.g., lens C1 and C2) are also situated on opposite sides of the first lens.

In one or more embodiments the lens array 202 is the same lens array 20 shown in FIG. 2). An imaging sensor 204 situated behind the lens array 202 records imaging data from the lens array 202. The processor 206 is configured to receive imaging data from the lens array 20 via the imaging sensor 204, and is configured to store that data in memory circuit 208. The processor 206 includes one or more processor circuits, including, for example, one or more microprocessors, microcontrollers, digital signal processors, or the like, and is configured with appropriate software and/or firmware to carry out one or more of the techniques discussed above. The memory circuit 208 includes one or several types of memory such as read-only memory (ROM), random-access memory, cache memory, flash memory devices, optical storage devices, etc. In one or more embodiments, the memory 208 includes program instructions that configure the processor 206 as described above. An electronic display 210 is configured to display information to a user of the camera. In one or more embodiments, the electronic display 210 is a liquid crystal display (LCD) that displays images recorded using the lens array 202. An input device 212 is configured to transmit user input to the processor 206 (e.g., settings to be used for recording composite images). In one or more embodiments, the input device 212 includes one or more input buttons and/or a touchscreen sensor used in conjunction with the electronic display 210. A power supply 214 powers the various components of the camera 200 that need power (e.g., processor 206, electronic display 210, etc.).

The camera 200 can be incorporated into any number of devices, such as a handheld digital camera, a smartphone that includes a camera, a tablet computing device, a laptop computing device, a standalone video camera, or any other imaging device. In one or more embodiments each of the lenses of the lens array 20 are microlenses, such that the lens array 20 has a small size suitable for inclusion in a smartphone. In one or more embodiments the camera 200 is a "light field" or "plenoptic" camera that enables image refocusing after imaging data has been recorded.

By using the techniques above, color fringing can be mitigated in a more efficient manner that is less computationally intensive than prior art techniques. For example, a depth map which was previously required to minimize color fringing, may be entirely omitted if desired.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method of recording a composite image using a lens array comprising a plurality of monochromatic lenses, each of which provides imaging data in shades of a single color, the method comprising:

recording a first composite image using a first lens that provides imaging data in a first color, a second lens that provides imaging data in a second color, and a third lens that provides imaging data in a third color, wherein the first, second, and third colors are different colors;

recording a second composite image using the first lens, a fourth lens that provides imaging data in the second color, and a fifth lens that provides imaging data in the third color;

identifying color fringed areas in the first and second composite images; and based on the relative size and location of the color fringed areas in the first and second composite images, applying a de-fringing algorithm to at least one of the composite images to mitigate the color fringing in the color fringed areas;

wherein the second and fourth lens are situated on opposite sides of the first lens; and wherein the third and fifth lens are also situated on opposite sides of the first lens.

2. The method of claim 1, wherein applying a de-fringing algorithm to at least one of the composite images to mitigate the color fringing in the color fringed areas comprises:

overlaying at least the color fringed portions of the first and second composite images;

for areas that are color fringed in the first composite image but are not color fringed in the second composite image, replacing imaging data for those areas of the first composite image with imaging data from those areas of the second composite image to form a modified first composite image; and for areas that are color fringed in the second composite image but are not color fringed in the first composite image, replacing imaging data for those areas of the second composite image with imaging data from those areas of the first composite image to form a modified second composite image.

3. The method of claim 2:

wherein recording the first composite image comprises:
  recording imaging data from the first, second, and third lenses;
  aligning the imaging data from the first, second, and third lenses according to a first alignment; and
  recording the first composite image based on the first alignment; and wherein recording the second composite image comprises:
  recording imaging data from the first, fourth, and fifth lenses;
  aligning the imaging data from the first, fourth, and fifth lenses according to a second alignment; and
  recording the second composite image based on the second alignment.

4. The method of claim 3, further comprising:

based on a width of color fringed areas from the first alignment, re-aligning the imaging data from the first, second, and third lenses according to a third alignment that is different from the first and second alignments;

recording a third composite image based on the third alignment;

based on a width of color fringed areas from the second alignment, re-aligning the imaging data from the first, fourth, and fifth lenses according to a fourth alignment that is different from the first, second, and third alignments;

recording a fourth composite image based on the fourth alignment;

for areas that are color fringed in the modified first composite image but are not color fringed in the third composite image, replacing imaging data for those areas of the modified first composite image with imaging data from those areas of the third composite image; and for areas that are color fringed in the modified first composite image but are not color fringed in the fourth composite image, replacing imaging data for those areas of the modified first composite image with imaging data from those areas of the fourth composite image.

5. The method of claim 1, wherein the lens array is an N×N lens array comprising:

a first type of row in which the first and second lenses are interleaved; and a second type of row in which the first and third lenses are interleaved;

wherein the first and second types of rows are interleaved in the N×N array; and wherein the first lenses in rows of the first type are offset from first lenses in adjacent rows of the second type.

6. The method of claim 1, wherein the first lens is adjacent to each of the second lens, the third lens, the fourth lens, and the fifth lens.

7. A camera comprising:

a lens array comprising a plurality of monochromatic lenses, each of which is configured to provide imaging data in shades of a single color; and a processor circuit configured to:
  record a first composite image using a first lens that provides imaging data in a first color, a second lens that provides imaging data in a second color, and a third lens that records imaging data in a third color, wherein the first, second, and third colors are different colors;
  record a second composite image using the first lens, a fourth lens that provides imaging data in the second color, and a fifth lens that provides imaging data in the third color;
  identify color fringed areas in the first and second composite images; and
  based on the relative size and location of the identified color fringed areas in the first and second composite images, apply a de-fringing algorithm to at least one of the composite images to mitigate the color fringing in the color fringed areas;

wherein the second and fourth lenses are situated on opposite sides of the first lens; and wherein the third and fifth lenses are also situated on opposite sides of the first lens.

8. The camera of claim 7, wherein to apply a de-fringing algorithm to at least one of the composite images to mitigate the color fringing in the color fringed areas, the processor circuit is configured to:

overlay at least the color fringed portions of the first and second composite images;

for areas that are color fringed in the first composite image but are not color fringed in the second composite image, replace the imaging data for those areas of the first composite image with the imaging data from those areas of the second composite image to form a modified first composite image; and for areas that are color fringed in the second composite image but are not color fringed in the first composite image, replace the imaging data for those areas of the second composite image with the imaging data from those areas of the first composite image to form a modified second composite image.

9. The camera of claim 8:
wherein to record the first composite image, the processor circuit is configured to:
record imaging data from the first, second, and third lenses;
align the imaging data from the first, second, and third lenses according to a first alignment; and
record the first composite image based on the first alignment; and
wherein to record the second composite image, the processor circuit is configured to:
record imaging data from the first, fourth, and fifth lenses;
align the imaging data from the first, fourth, and fifth lenses according to a second alignment; and
record the second composite image based on the second alignment.

10. The camera of claim 9, wherein the processor circuit is further configured to:
based on a width of color fringed areas from the first alignment, re-align the imaging data from the first, second, and third lenses according to a third alignment that is different from the first and second alignments;
record a third composite image based on the third alignment;
based on a width of color fringed areas from the second alignment, re-align the imaging data from the first, fourth, and fifth lenses according to a fourth alignment that is different from the first, second, and third alignments;
record a fourth composite image based on the fourth alignment;
for areas that are color fringed in the modified first composite image but are not color fringed in the third composite image, replace imaging data for those areas of the modified first composite image with imaging data from those areas of the third composite image; and
for areas that are color fringed in the modified first composite image but are not color fringed in the fourth composite image, replace imaging data for those areas of the modified first composite image with imaging data from those areas of the fourth composite image.

11. The camera of claim 7, wherein the lens array is an N×N lens array comprising:
a first type of row in which the first and second lenses are interleaved; and
a second type of row in which the first and third lenses are interleaved;
wherein the first and second types of rows are interleaved in the N×N array; and
wherein the first lenses in rows of the first type are offset from first lenses in adjacent rows of the second type.

12. The camera of claim 7, wherein the first lens is adjacent to each of the second lens, the third lens, the fourth lens, and the fifth lens.

* * * * *